(No Model.)
W. HAMILTON.
HOOF WEIGHT.
No. 509,804.  Patented Nov. 28, 1893.
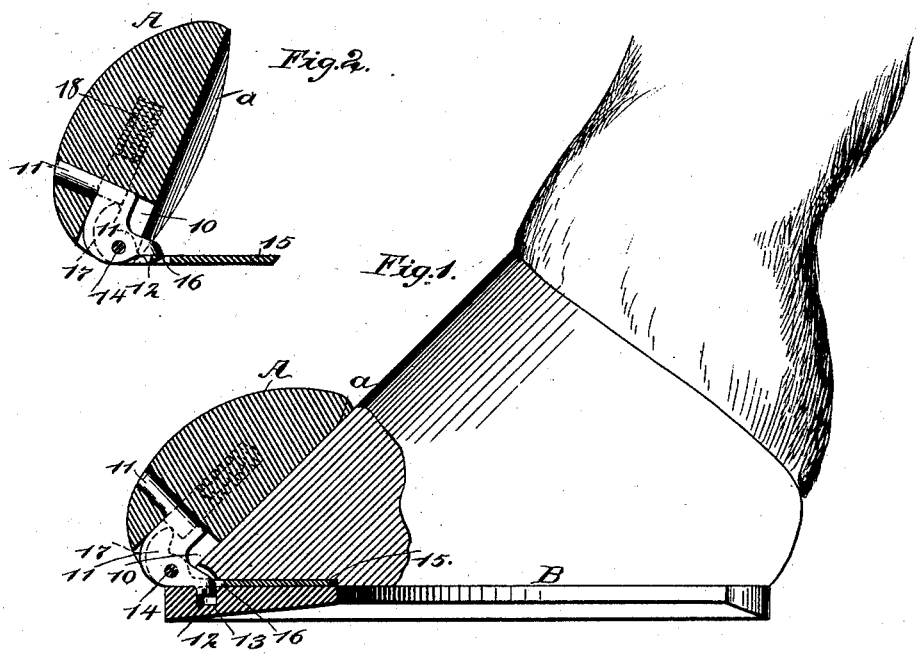
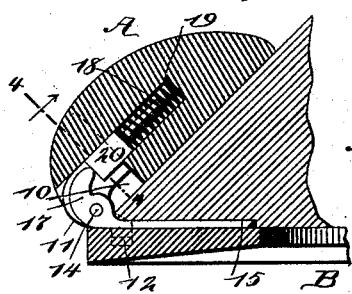
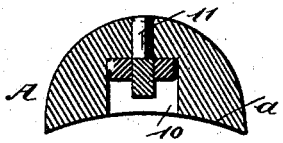
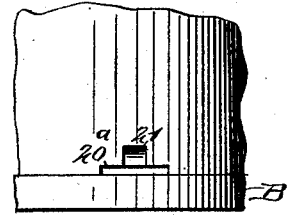
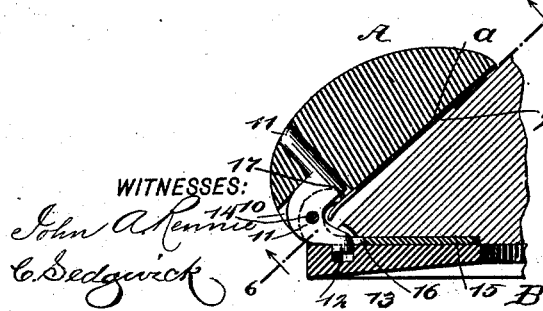
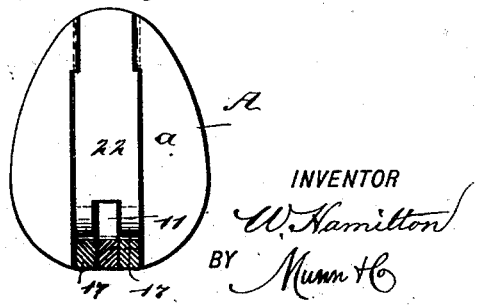
WITNESSES:
John A. Rennie
C. Sedgwick
INVENTOR
W. Hamilton
BY Munn & Co.
ATTORNEYS.

UNITED STATES PATENT OFFICE.

WILLIAM HAMILTON, OF BEDFORD, IOWA.

HOOF-WEIGHT.

SPECIFICATION forming part of Letters Patent No. 509,804, dated November 28, 1893.

Application filed February 4, 1893. Renewed October 31, 1893. Serial No. 489,664. (No model.)

*To all whom it may concern:*

Be it known that I, WILLIAM HAMILTON, of Bedford, in the county of Taylor and State of Iowa, have invented a new and Improved Weight for Horses' Hoofs, of which the following is a full, clear, and exact description.

My invention relates to an improvement in weights for horses' hoofs, and it has for its object to provide a toe or side weight which will adjust itself to the inclination of the hoof to which it is applied, and which will be self-locking and of simple, durable and economic construction.

A further feature of the invention is to provide a weight which will be an improvement upon the weight for which Letters Patent were granted to George R. King, No. 460,017, September 22, 1891, the said weight being so constructed that but a small opening need be made in the horse's hoof to receive the fastening devices, and whereby also when the weight is applied to a hoof there will be no vertical play whatever, thus preventing the possibility of the weight leaving the hoof even when its under face is brought in contact with any object.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a vertical section through the preferred form of weight, illustrating it as applied to a horse's hoof. Fig. 2 is a vertical section through the preferred form of the weight. Fig. 3 is a sectional view through a hoof and the preferred form of weight, showing the application of the one to the other. Fig. 4 is a vertical section taken essentially on the line 4—4 of Fig. 3. Fig. 5 is a vertical section, taken through a modified form of the weight, illustrating the weight applied to a hoof. Fig. 6 is a horizontal section through the weight, taken essentially on the line 6—6 of Fig. 5; and Fig. 7 is a front elevation of a hoof, illustrating the size and character of the opening required to be made in it for the reception of the weight.

In carrying out the invention the weight A, may be of any suitable or approved shape, and may be made as heavy as may be found desirable.

I will first describe the construction of the preferred form of the device, which is as follows:

The weight is preferably given a somewhat cylindrical outer surface and a slightly concaved inner face, which latter face is indicated by the reference letter *a*. In the central portion of the weight, at its lower edge, an angular recess 10 is produced, the recess being somewhat L-shaped, the vertical section of the recess extending from the bottom to the top or outer surface of the weight while the horizontal portion of the recess extends through the bottom and lower edge of the weight. As shown in Fig. 4, the horizontal member or portion of the recess 10 is much wider than the vertical member or portion, and in the center of the recess 10 an angular arm 11, is firmly secured. The vertical member of the arm extends upward through the vertical portion of the recess, and the head of the arm at the outer surface of the weight is headed or otherwise flattened. The headed surface of the arm corresponds in exterior contour to that of the weight. The main body of the arm 11 is contained within the central portion of the horizontal section of the recess 10, and is curved at its lower end to correspond to the curvature of that portion of the weight; and the lower portion of the arm is curved inwardly beneath the under face of the weight, and the curved section of the arm is provided with a downwardly extending lock lug 12, the said lug being intended to enter a recess 13, made in the upper face of the horse shoe B, near its outer forward edge. Ordinarily a pin 14, is passed through the body portion of the arm 11, which pin extends entirely across the lower or wider portion of the recess 10.

A locking plate 15, is used in conjunction with the weight. This plate is quite thin, is rectangular in cross section, and is solid throughout its length with the exception of at its forward end, where it is provided with a central longitudinal recess 16, and the members of the plate created by the formation of the recess are carried upward and inward, forming knuckles 17, one knuckle being located at each side of the body portion of the arm 11, and the knuckles are pivoted upon the pin 14, passed through the arm, thus giving the locking plate a hinged connection with the weight. The locking lug on the arm 11, passes freely downward and is capable of having free movement in the slot 16 of the locking plate. The locking plate is spring-controlled and ordinarily spiral springs 18, are located in chambers 19, formed in the body, one at each side of the center, the chambers communicating with the recess 10. Each spring 18, has passed through it the shank of a plunger 20, and the plungers have bearing upon the outer ends of the springs, as shown in Fig. 3, and likewise have bearings on the knuckles 17 of the locking plate 15.

In the application of a weight to a hoof, a shallow or narrow channel $20^a$, is made in the bottom of the hoof, commencing at the outer edge and extending inward a sufficient distance to accommodate the length of the locking plate 15. In fact the channel $20^a$, is made of a length and width just sufficient to receive the said plate; and in the front portion of the hoof, over the central portion of the channel, a small cavity 21, is produced, connected with said channel, as shown in Fig. 7.

In applying the weight the locking plate is carried downward until it is at an angle, almost a right angle, to the weight, as shown in Fig. 2, whereupon the locking lug of the arm will be contained within the slot 16 of the plate, and the lower end of the lug will be practically flush with the under face of the plate. The plate may now be inserted in the channel $20^a$ in the hoof and is forced inward until it is well seated in said channel. The weight is then released and will fall to an engagement with the horse's hoof, as shown in Fig. 1, and when it has accommodated itself to the exterior shape of the hoof the locking lug will have entered the recess 13 in the shoe.

It will thus be observed that the recess 21 in the hoof need only be of sufficient size to permit the downward movement of the locking lug. It will be further observed that but a comparatively small portion of the hoof is removed, and as the channel in the hoof is of the same size as the locking plate it is adapted to receive, no matter what obstacle may contact with the under surface of the weight upon the hoof, the weight will not in any event have vertical movement since it is firmly held in place by the upper walls of the channel $20^a$, and it can not possibly slip laterally from the hoof since the locking lug being embedded in the shoe will prevent it.

In the modified form of the device the construction is the same as that given in relation to the preferred form with the exception of the location and shape of the spring. The spring instead of being spiral and located within the chambers in the body is flat, as shown at 22 in Figs. 5 and 6, being secured at one end to the upper portion of the inner face of the body A at the center thereof, a suitable recess being made in said surface to receive the spring. The outer free end of the spring is bifurcated in order that it may pass the arm 11, the members of the spring at its free end having bearing upon the knuckles 17 of the locking plate.

Having thus described my invention, I claim as new and desire to secure by Letters Patent—

1. A hoof weight, the same consisting of a body, an arm secured in the lower portion of the body and provided with a downwardly extending lug, a plate slotted to receive the lug and provided with knuckles at its slotted end, pivoted within the body, one at each side of the arm, and a spring connected with the body and having bearing upon said knuckles, substantially as shown and described, whereby the plate may be made quite narrow, and when the plate and body are carried in opposite directions the lug upon the arm will be practically flush with the under face of the plate, thus requiring but a small cavity to be made in a hoof for the reception of the plate, as and for the purpose specified.

2. A weight for horses' hoofs, the same consisting of a body weight, a lug fixed to the body and extending downwardly from the rear portion thereof, a plate of uniform thickness slotted at one end to receive the lug, the slotted end of the plate being provided with knuckles extending within the body, the knuckles having pivotal connection with the body, and a spring carried by the body and bearing against the knuckles, as and for the purpose specified.

WILLIAM HAMILTON.

Witnesses:
J. FRED. ACKER,
EDGAR TATE.